(12) United States Patent
Yang et al.

(10) Patent No.: US 12,132,919 B2
(45) Date of Patent: Oct. 29, 2024

(54) NEURAL IMAGE COMPRESSION WITH CONTROLLABLE SPATIAL BIT ALLOCATION

(71) Applicant: QUALCOMM Incorporated, San Diego, CA (US)

(72) Inventors: Yang Yang, San Diego, CA (US); Hoang Cong Minh Le, La Jolla, CA (US); Yinhao Zhu, La Jolla, CA (US); Reza Pourreza, San Diego, CA (US); Amir Said, San Diego, CA (US); Yizhe Zhang, San Diego, CA (US); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/987,844

(22) Filed: Nov. 15, 2022

(65) Prior Publication Data

US 2023/0156207 A1    May 18, 2023

Related U.S. Application Data

(60) Provisional application No. 63/280,097, filed on Nov. 16, 2021.

(51) Int. Cl.
*H04N 19/124*     (2014.01)
*H04N 19/119*     (2014.01)
*H04N 19/147*     (2014.01)
*H04N 19/17*      (2014.01)
*H04N 19/436*     (2014.01)

(52) U.S. Cl.
CPC ......... *H04N 19/436* (2014.11); *H04N 19/119* (2014.11); *H04N 19/124* (2014.11); *H04N 19/147* (2014.11); *H04N 19/17* (2014.11)

(58) Field of Classification Search
CPC .. H04N 19/436; H04N 19/119; H04N 19/124; H04N 19/147; H04N 19/17; H04N 19/167; H04N 19/174
See application file for complete search history.

(56) References Cited

U.S. PATENT DOCUMENTS 11,677,948 B2 *   6/2023   Besenbruch ............ G06T 9/002
                                               375/240.03

FOREIGN PATENT DOCUMENTS

WO    WO-2022067656 A1 *   4/2022

OTHER PUBLICATIONS

Cai C., et al., "End-to-End Optimized ROI Image Compression", IEEE Transactions on Image Processing, IEEE, USA, vol. 29, Dec. 25, 2019, pp. 3442-3457.

(Continued)

*Primary Examiner* — Tat C Chio
(74) *Attorney, Agent, or Firm* — Seyfarth Shaw LLP

(57) ABSTRACT

A processor-implemented method for image compression using an artificial neural network (ANN) includes receiving, at an encoder of the ANN, an image and a spatial segmentation map corresponding to the image. The spatial segmentation map indicates one or more regions of interest. The encoder compresses the image according to a controllable spatial bit allocation. The controllable spatial bit allocation is based on a learned quantization bin size.

20 Claims, 13 Drawing Sheets

(56) References Cited

OTHER PUBLICATIONS

Perugachi-Diaz Y., et al., "Region-of-Interest Based Neural Video Compression", arxiv.org, Cornell University Library, 201 Olin Library Cornell University Ithaca, NY 14853, Mar. 3, 2022, pp. 1-16.
International Search Report and Written Opinion—PCT/US2022/050145—ISA/EPO—Feb. 22, 2023.
Ma Y., et al., "Variable Rate ROI Image Compression Optimized for Visual Quality", 2021 IEEE/CVF Conference on Computer Vision and Pattern Recognition Workshops (CVPRW), IEEE, Jun. 19, 2021, pp. 1936-1940.
Song M., et al., "Variable-Rate Deep Image Compression Through Spatially-Adaptive Feature Transform", arxiv.org, Cornell University Library, 201 Olin Library Cornell University Ithaca, NY 14853, Aug. 21, 2021, 20 Pages.

* cited by examiner

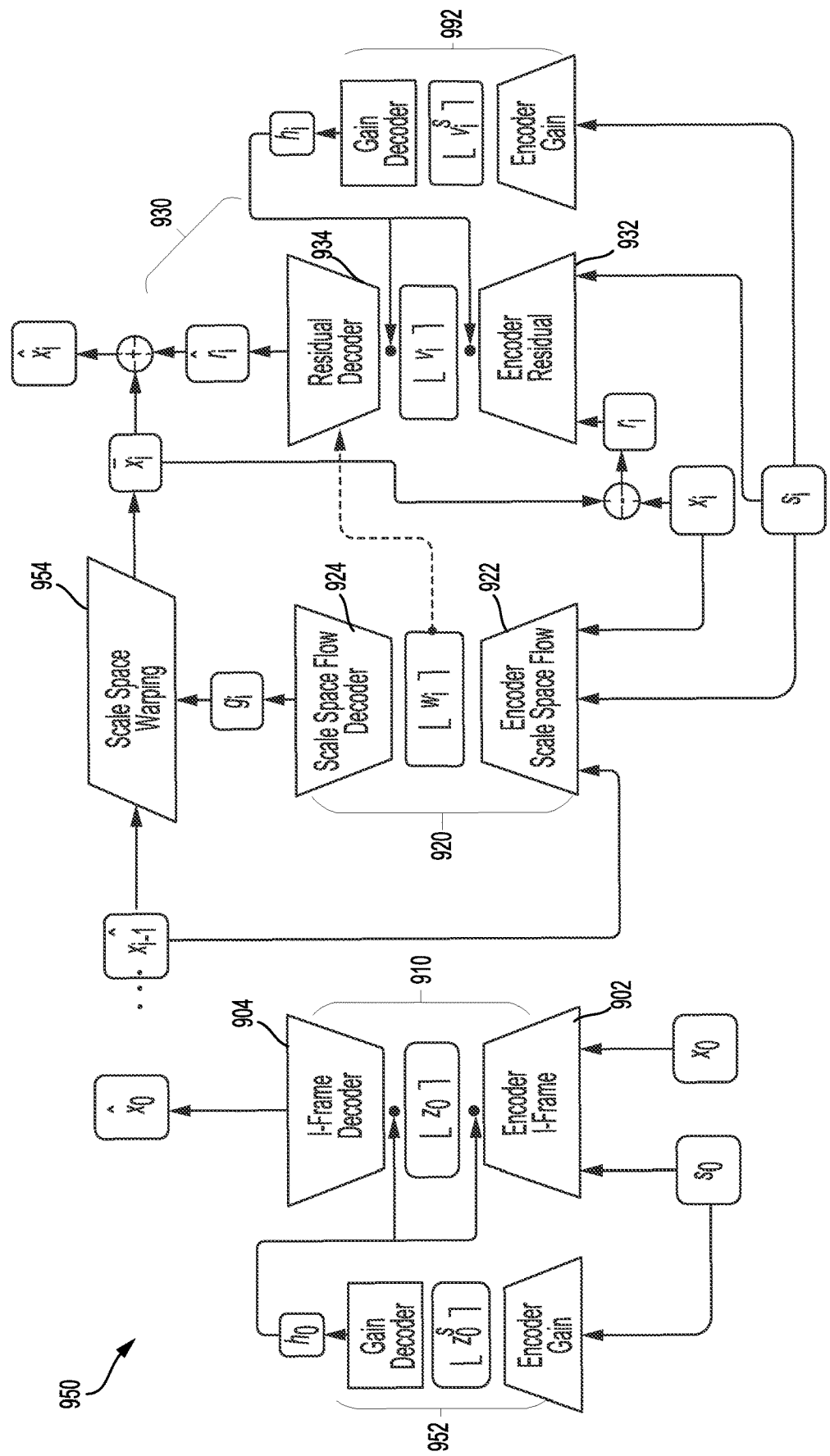
FIG. 9B (b) Latent-scaling ROI Scale-Space Flow

1000

1002

RECEIVING, AT AN ENCODER OF AN ARTIFICIAL NEURAL NETWORK, AN IMAGE AND A SPATIAL SEGMENTATION MAP CORRESPONDING TO THE IMAGE, THE SPATIAL SEGMENTATION MAP INDICATING ONE OR MORE REGIONS OF INTEREST

1004

COMPRESSING, VIA THE ENCODER, THE IMAGE ACCORDING TO A CONTROLLABLE SPATIAL BIT ALLOCATION, THE CONTROLLABLE SPATIAL BIT ALLOCATION IS BASED ON A LEARNED QUANTIZATION BIN SIZE

*FIG. 10*

NEURAL IMAGE COMPRESSION WITH CONTROLLABLE SPATIAL BIT ALLOCATION

CROSS-REFERENCE TO RELATED APPLICATION

The present application claims the benefit of U.S. Provisional Patent Application No. 63/280,097, filed on Nov. 16, 2021, and titled "NEURAL IMAGE COMPRESSION WITH CONTROLLABLE SPATIAL BIT ALLOCATION," the disclosure of which is expressly incorporated by reference in its entirety.

FIELD OF DISCLOSURE

Aspects of the present disclosure generally relate to neural networks, and more particularly, to image compression with controllable spatial bit allocation using artificial neural networks.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Neural networks have successful application in multimedia compression such as video compression and image compression. Image compression is beneficial for communicating multimedia such as images and videos. However, users may have different computer architectures with different compute capabilities and may be operating such devices under different network conditions. Conventional image codec and neural image compression schemes optimize for a rate-distortion trade-off of the whole image uniformly across different spatial locations, without regard to whether there are areas that are more important/salient than other areas in each image.

SUMMARY

In one aspect of the present disclosure, a processor-implemented method, includes receiving, at an encoder of an artificial neural network, an image and a spatial segmentation map corresponding to the image, the spatial segmentation map indicating one or more regions of interest. The method further includes compressing, via the encoder, the image according to a controllable spatial bit allocation, the controllable spatial bit allocation is based on a learned quantization bin size.

Another aspect of the present disclosure is directed to an apparatus having a memory and one or more processors coupled to the memory. The processor(s) is configured to receive, at an encoder of an artificial neural network, an image and a spatial segmentation map corresponding to the image, the spatial segmentation map indicating one or more regions of interest. The processor(s) is further configured to compress, via the encoder, the image according to a controllable spatial bit allocation, the controllable spatial bit allocation is based on a learned quantization bin size.

In one aspect of the present disclosure, a processor-implemented method includes receiving, at a decoder of an artificial neural network, a bit stream from an encoder. The method further includes decoding, via the decoder, the bit stream to recover a quantized latent representation of an image corresponding to a spatial segmentation map, the spatial segmentation map indicating one or more regions of interest. The method still further includes applying reciprocal gain control elements to the quantized latent representation to produce the spatial segmentation map, the reciprocal gain control elements having a gain value corresponding to a learned quantization bin size. The method also includes generating, via the decoder, a reconstructed image based on the spatial segmentation map.

Another aspect of the present disclosure is directed to an apparatus having a memory and one or more processors coupled to the memory. The processor(s) is configured to receive, at a decoder of an artificial neural network, a bit stream from an encoder. The processor(s) is further configured to decode, via the decoder, the bit stream to recover a quantized latent representation of an image corresponding to a spatial segmentation map, the spatial segmentation map indicating one or more regions of interest. The processor(s) is still further configured to apply reciprocal gain control elements to the quantized latent representation to produce the spatial segmentation map, the reciprocal gain control elements having a gain value corresponding to a learned quantization bin size. The processor(s) is also configured to generate, via the decoder, a reconstructed image based on the spatial segmentation map.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 9A and 9B are block diagrams illustrating example architectures for image compression with controllable spatial bit allocation using an artificial neural network (ANN), in accordance with aspects of the present disclosure.

FIGS. 10 and 11 are flow charts illustrating methods for operating an artificial neural network, in accordance with aspects of the present disclosure.

DETAILED DESCRIPTION

Figure 1:
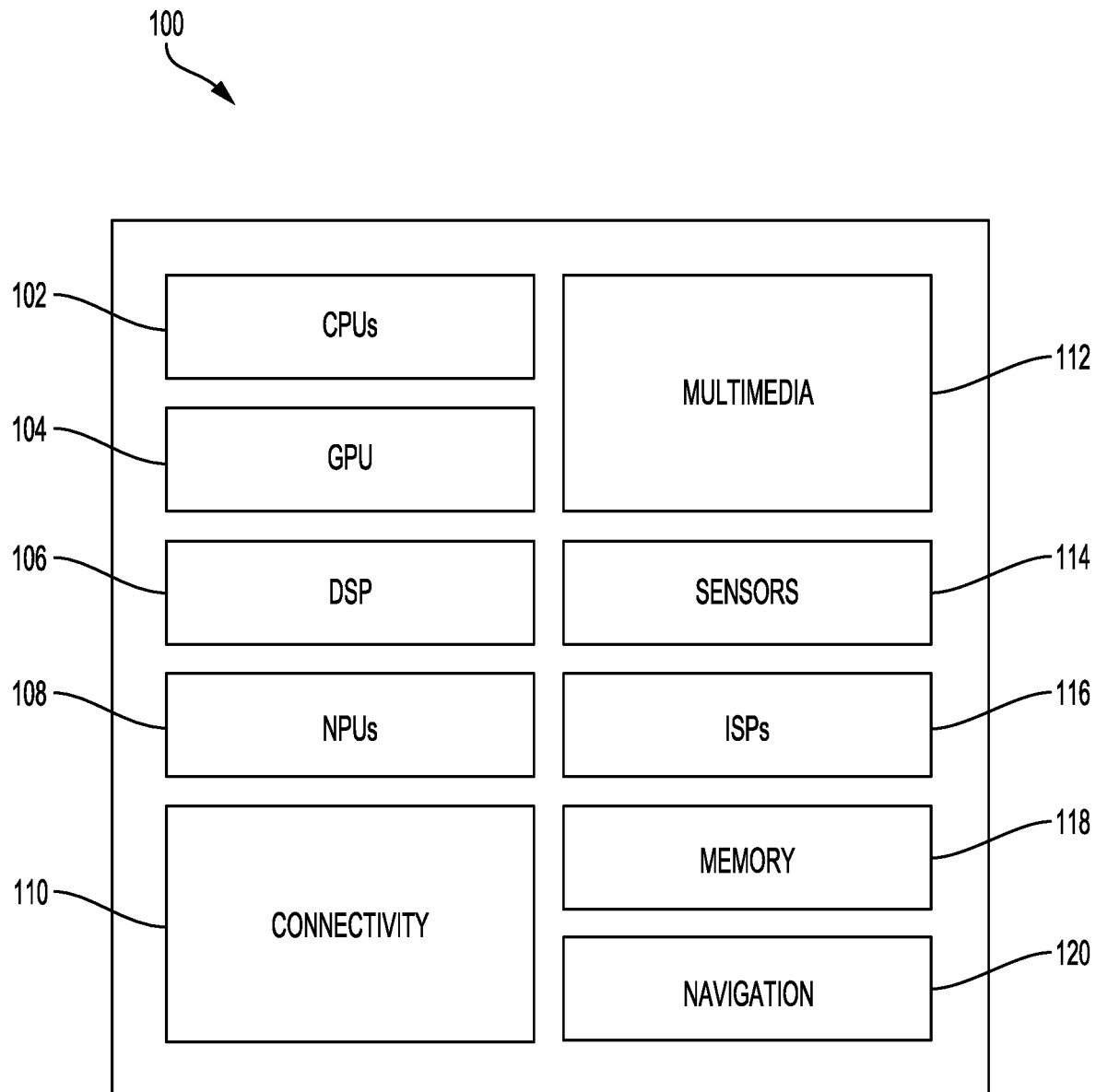
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, neural networks have successful application in multimedia compression such as video compression and image compression. Image compression is beneficial for communicating multimedia such as images and videos. However, users may have different computer architectures with different compute capabilities and may be operating such devices under different network conditions.

Some conventional image codec and neural image compression schemes are biologically inspired. Humans perceive different parts of a scene with different resolutions, focusing on more salient regions of interest. With this in mind, conventional object-based codecs employ non-uniform allocation of bits in favor of salient regions, at the expense of increased distortion in the remaining areas. This conventional approach may allow a boost in perceptual quality under low rate constraints. Other conventional neural codecs have been introduced for video compression. However, these conventional neural codecs operate uniformly over all spatial locations. That is, these conventional neural codecs optimize for a rate-distortion trade-off of the whole image uniformly across different spatial locations, without regard to whether there are areas that are more important/salient than other areas in each image.

To address these and other challenges, in accordance with aspects of the present disclosure, semantic information regarding areas of the image including the salient aspects (e.g., including one or more specific objects of interest) may be combined with neural compression to prioritize such regions of interest. Prioritization may, for example, result in allocating more bits in the region of interest than other regions of the image to reduce distortion in the regions of interest compared to other regions (e.g., background) of the image.

Aspects of the present disclosure may beneficially be applied to video conferencing, vehicle camera recording (e.g., other cars or traffic signs), video surveillance (e.g., car license plate or human face), foveated video streaming (e.g., where part of the image is in high resolution while the remainder is effectively blurred—may be applied), and other video processing applications.

FIG. 1 illustrates an example implementation of a system-on-a-chip (SOC) 100, which may include a central processing unit (CPU) 102 or a multi-core CPU configured for operating an artificial neural network (e.g., a neural end-to-end network) to provide image compression and communication. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive, at an encoder of an artificial neural network, an image and a spatial segmentation map corresponding to the image. The spatial segmentation map indicates one or more regions of interest. The general-purpose processor 102 may also include code to compress, via the encoder, the image according to a controllable spatial bit allocation. The controllable spatial bit allocation is based on a learned quantization bin size.

The SOC 100 may be based on an ARM instruction set. In an aspect of the present disclosure, the instructions loaded into the general-purpose processor 102 may include code to receive, at a decoder of an artificial neural network, a bit stream from an encoder. The general-purpose processor 102 may also include code to decode, via the decoder, the bit stream to recover a quantized latent representation of an image corresponding to a spatial segmentation map. The spatial segmentation map indicates one or more regions of interest. The general-purpose processor 102 may additionally include code to apply reciprocal gain control elements to the quantized latent representation to produce the spatial segmentation map. The reciprocal gain control elements have a gain value corresponding to a learned quantization bin size. The general-purpose processor 102 may further include code to generate, via the decoder, a reconstructed image based on the spatial segmentation map.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
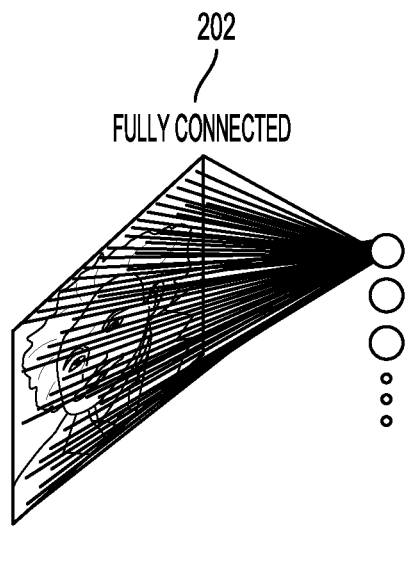
FIGS. 2A, 2B, and 2C are diagrams illustrating a neural network, in accordance with aspects of the present disclosure.
Figure 2B:
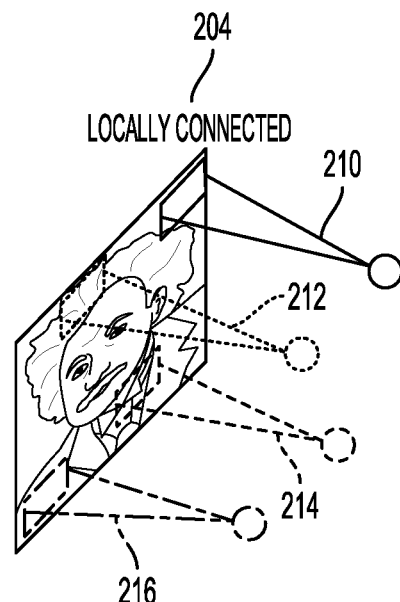

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
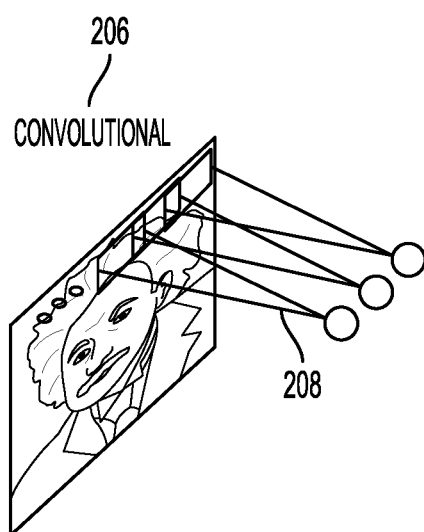

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
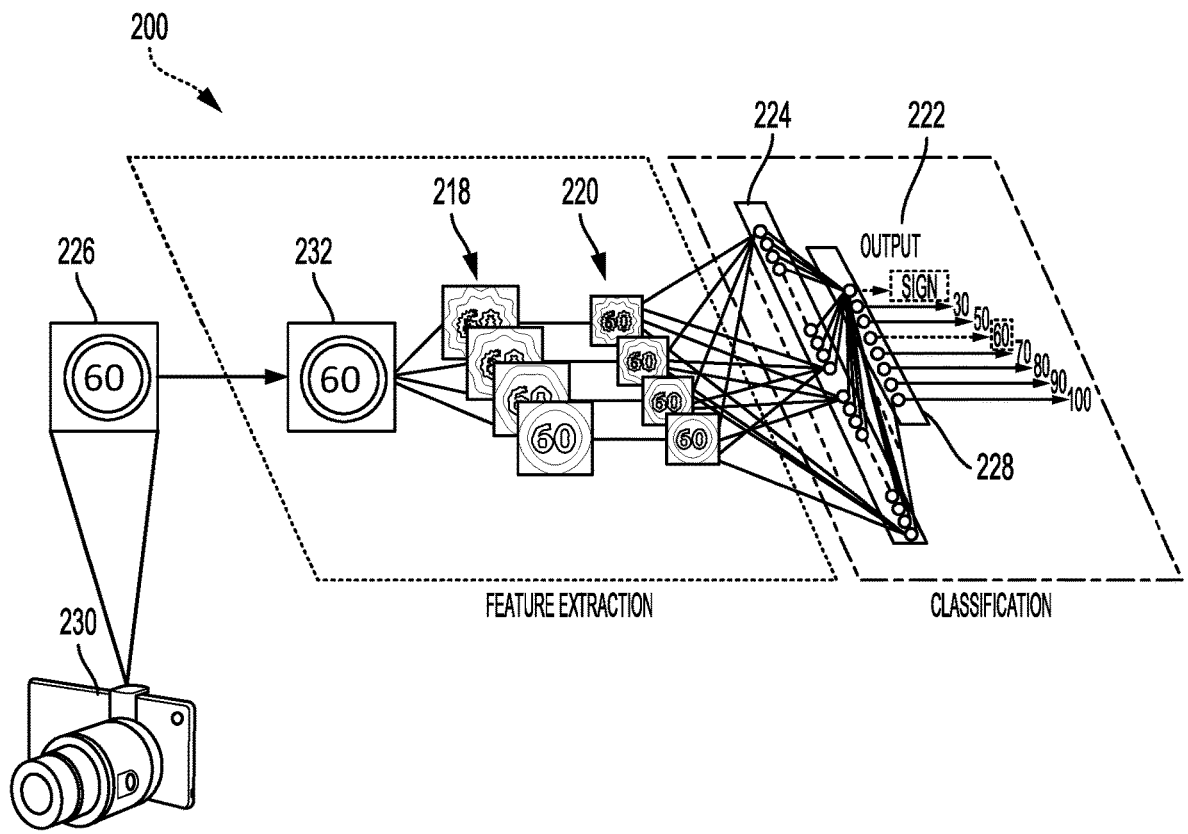
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). A RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
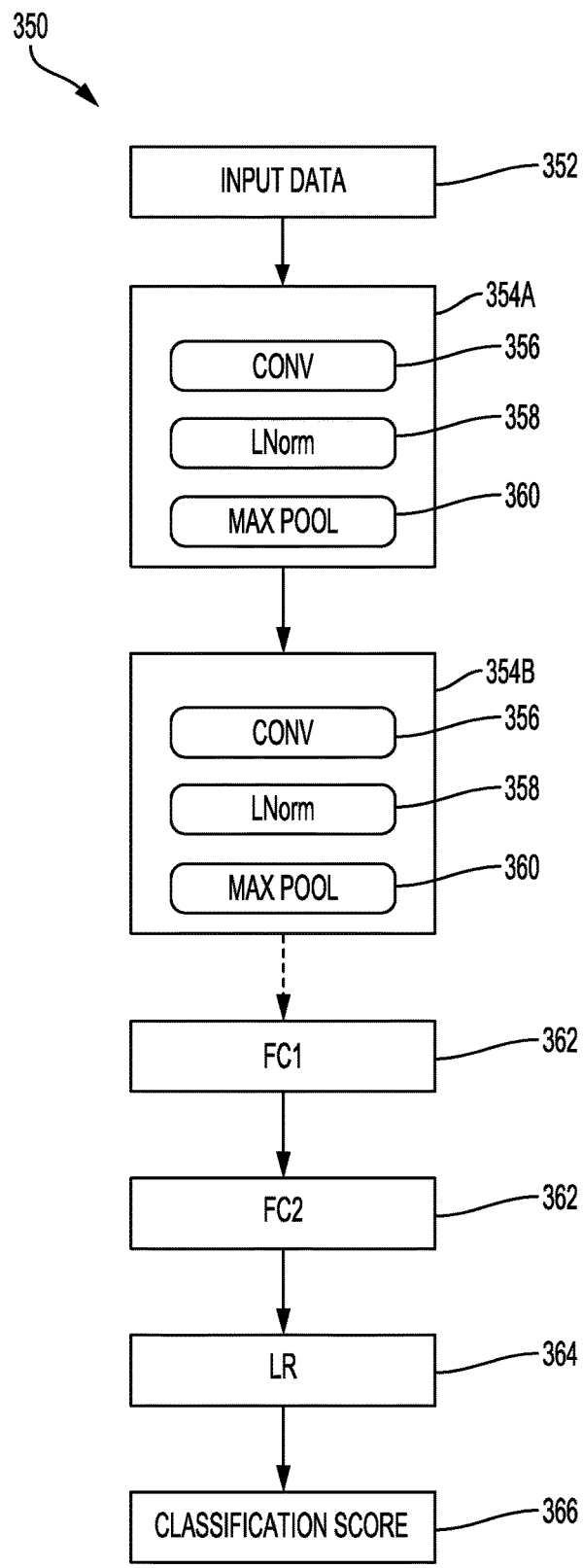
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
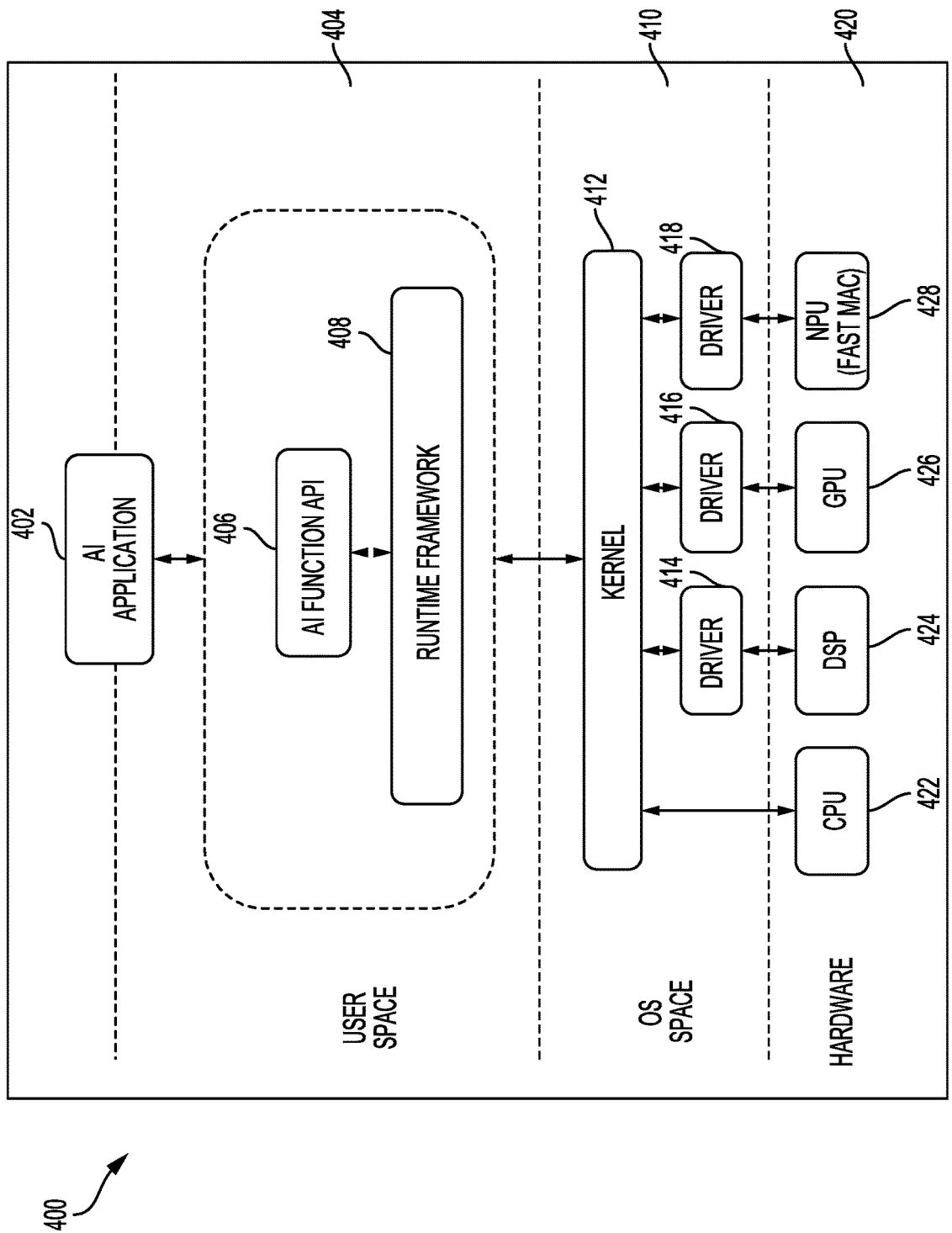
FIG. 4 is a block diagram illustrating an exemplary software architecture 400 that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

As described, aspects of the present disclosure are directed to neural image compression. In accordance with aspects of the present disclosure, semantic information regarding areas of the image including the salient aspects (e.g., including one or more specific objects of interest) may be combined with neural compression to prioritize such regions of interest. Prioritization may, for example, result in allocating more bits in the region of interest than other regions of the image to reduce distortion in the regions of interest compared to other regions (e.g., background) of the image.

A video frame may be defined as $x_i \in \mathbb{R}^{H \times W \times 3}$ at time step I, where H is height and W is width. Then a video sequence may be denoted as $x=\{x_0, x_1, \ldots x_T\}$, with T=1 frames. The sequence of binary region of interest (ROI) masks corresponding to the video sequence may be defined as $s=\{s_0, s_1, \ldots s_T\}$, where $s_i \in \{0,1\}^{H \times w}$.

One neural video codec includes an I-frame codec and a P-frame codec. The I-frame codec is a mean-scale hyperprior auto encoder (AE) that encodes individual frames $x_0$ independently to produce a reconstruction $\hat{x}_0$. The P-frame codec may be comprised of two hyperprior AEs. The first hyperprior AE, the P-frame flow hyperprior AE estimates a scale-space flow $g_i$ from the previous reconstruction $\hat{x}_{i-1}$ and current frame $x_i$, which may be used to warp the previous reconstruction into $\bar{x}_i$. The second hyperprior AE, the P-frame residual hyperprior AE, encodes the residual $r_i = \bar{x}_i - x_i$. The final reconstruction $\hat{x}_i$ may be obtained by adding the warped prediction $\bar{x}_i$ and the estimated residual $\hat{r}_i$. The latent codes of each hyperprior AE denoted by $z_0$, $w_i$, and $v_i$ may be rounded to integer values and then entropy-coded using the prior parameters estimated by their respective hyper-decoder.

Aspects of the present disclosure provide for controlling the spatial bit allocation using latent-scaling. A scaling factor may be applied to the latent to change the quantization step size, leading to different trade-offs between rate and distortion. For ease of exposition, latent-scaling for the I-frame hyperprior AE is described. However, it should be understood that the same latent-scaling process may also be applied to the P-frame residual hyperprior AE.

In accordance with aspects of the present disclosure, a hyperprior-like network referred to as a gain hyperprior AE is provided. The gain hyperprior AE may encode the ROI mask $s_0$ into a latent code $z_0^s$. The latent code $z_0^s$ may be decoded to a gain variable $h_0$ that shares the same dimensions as the latent variable $z_0$, both spatially and channel-wise. In contrast, conventional latent scaling only uses channel-wise gain. The latent $z_0$ may be scaled with the inverse of the estimated spatial gain variable $h_0$, where $h_0 \geq 1$. In this manner, the gain may only make the quantization grid coarser, which may result in allocating less bits in these regions. The mean $\mu$ and scale $\sigma$ may be denoted as the prior parameters estimated by the I-frame hyper-decoder. In a quantization step, the scaled latent $z_0 \oslash h_0$ may be centered by its prior mean $\mu \oslash h_0$, where $\oslash$ is an elementwise division. Next, a rounding operator $\lfloor \cdot \rceil$ may be applied on $(z_0 - \mu) \oslash h_0$ such that the estimated mean $\mu$ learned by the hyperprior-encoder is on the grid. Then the offset $\mu \oslash h_0$ may be added back. The de-quantized latent $\hat{z}_0(h_0)$ may be obtained by multiplying by $h_0$ after the quantization block. That is, the de-quantized latent $\hat{z}_0(h_0)$ may be given by:

$$\hat{z}_0(h_0) = \lfloor (z_0 - \mu) \oslash h_0 \rceil \odot h_0 + \mu, \quad (1)$$

where $\odot$ denotes elementwise multiplication. The de-quantized latent $\hat{z}_0(h_0)$ may be passed to the decoder to generate the reconstructed frame $\hat{x}_0$. For rate computation and entropy coding, the modified probability $\mathbb{P}$ of $\hat{z}_0(h_0)$ is used as follows:

$$\mathbb{P}(\hat{z}_0(h_0)) = \int_{\hat{z}_0(h_0) - h_0/2}^{\hat{z}_0(h_0) + h_0/2} \mathcal{N}(x - \mu \mid 0, \sigma) dx \quad (2)$$

$$= \int_{\hat{z}_0(h_0)/h_0 - 1/2}^{\hat{z}_0(h_0)/h_0 + 1/2} \mathcal{N}\left(x - \frac{\mu}{h_0} \mid 0, \frac{\sigma}{h_0}\right) dx. \quad (3)$$

As indicated in Equation 2, latent-scaling may be interpreted as effectively changing the quantization grid or bin width. In practice, for entropy coding the quantization grid may be unchanged and round to the integer grid and scale the prior appropriately, as in Equation 3. As described, the same process may be applied to the P-frame residual latent code $v_t$.

The rate-distortion (R-D) loss may be adapted to take into account the ROI mask. The rate and distortion for all frames in the video sequence x may be summed with corresponding ROI masks s:

$$\mathcal{L} = \beta \mathcal{L}_R + \sum_{i=0}^{T} \mathcal{L}_{D,i}, \quad (4)$$

where $\beta$ is rate-distortion trade-off variable. $\mathcal{L}_D$ represents the distortion loss which is a modified mean squared error (MSE) involving the binary ROI mask:

$$\mathcal{L}_{D,i} = \text{mean}\left(s_i \odot \epsilon + \frac{1}{\gamma} \cdot (1 - s_i) \odot \epsilon\right), \quad (5)$$

where mean computes the average over the image dimensions, $\gamma$ is the penalty for the non-ROI, $\epsilon = (x_i - \hat{x}_i)^2$ is the squared error and $s_i$ is broadcasted over the channel dimension.

Further, the rate loss $\mathcal{L}_R$ is computed with the estimated cross-entropy $\mathcal{H}(\cdot)$ by the hyperprior of each latent variable present in the model. For implicit ROI, the rate loss $\mathcal{L}_{I,R}$ is equal to:

$$\mathcal{L}_{I,R} = \mathcal{H}(z_0) + \sum_{i=1}^{T} [\mathcal{H}(v_i) + \mathcal{H}(w_i)]. \quad (6)$$

The rate loss $\mathcal{L}_{LS,R}$ of the latent-scaling ROI also includes latent variables $z_0^s$ for the latent scaling of the I-frame hyperprior AE and $v_i^s$ for the latent scaling of the P-frame residual hyperprior AE. The rate loss for the latent-scaling ROI is then given by:

$$\mathcal{L}_{LS,R} = \mathcal{H}(z_0^s) + \mathcal{H}(z_0) + \sum_{i=1}^{T} [\mathcal{H}(v_i^s) + \mathcal{H}(v_i) + \mathcal{H}(w_i)]. \quad (7)$$

The rate of the hyper latent codes is also used as part of the rate-loss during training, but is not expressed in equations here for simplicity.

In practice, the two extra rate contributions from the ROI masks $\mathcal{H}(z_0^s)$ and $\mathcal{H}(v_i^s)$ are only a small fraction compared to the standard rate components $\mathcal{H}(z_0)$ and $\mathcal{H}(v_i)$ of the model.

Figure 5:
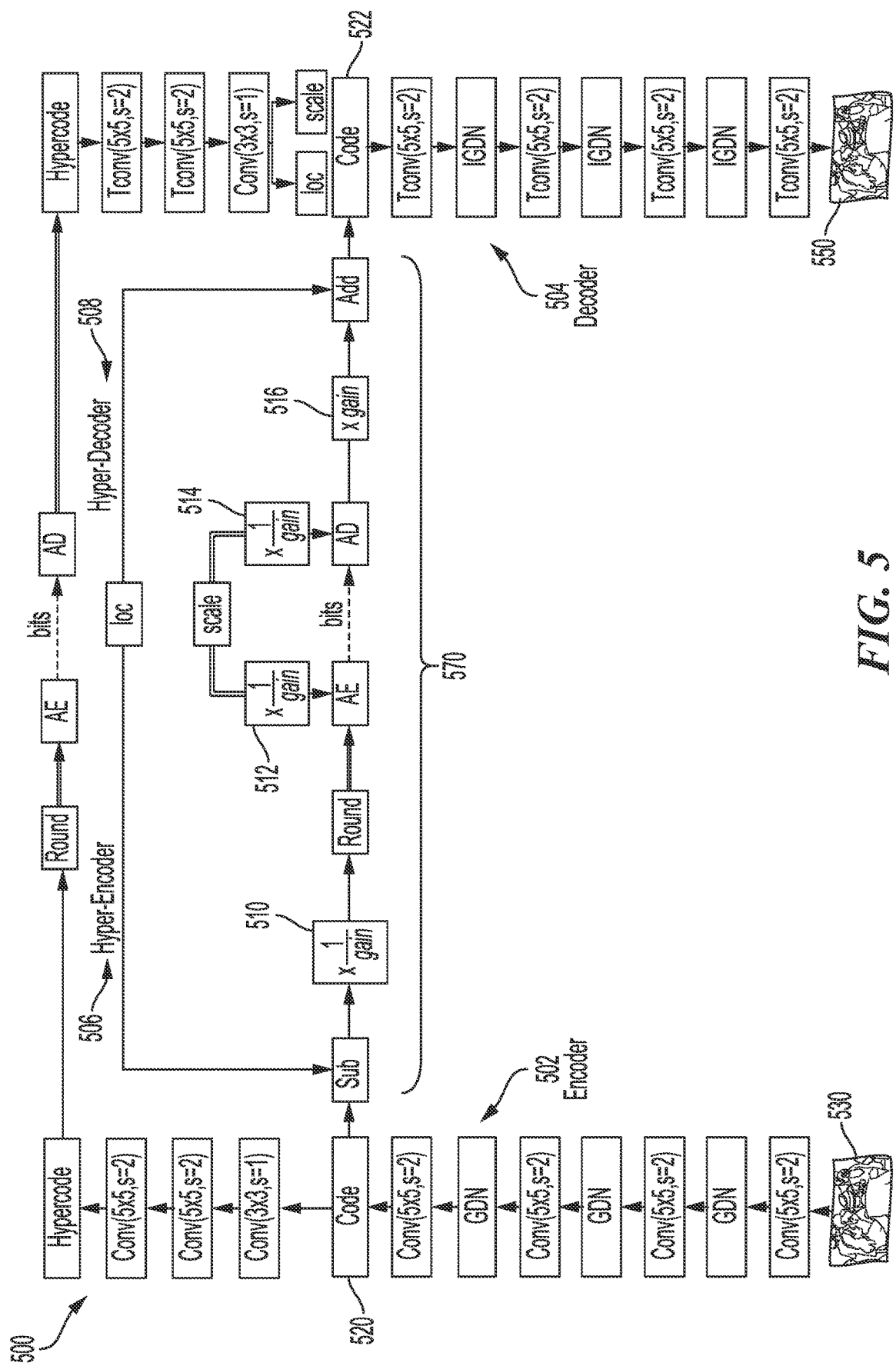
FIG. 5 is a block diagram illustrating an example architecture for neural compression with gain control, in accordance with aspects of the present disclosure.

FIG. 5 is a block diagram illustrating an example architecture 500 for neural compression with gain control, in accordance with aspects of the present disclosure. The architecture 500 may include an encoder 502 and a decoder 504. The architecture 500 may also include a hyper-encoder 506 and a hyper-decoder 508. The hyper-encoder 506 and the hyper-decoder 508 may manage a compression pipeline 570 between the encoder 502 and decoder 504.

The encoder 502 may include multiple convolutional layers (Cony) interleaved with an activation layer, such as a general divisive normalization layer (GDN), for example. The convolutional layers may successively process an input 530, such as an image, to extract features of the input 530 and generate a latent representation (code) 520 of the input 530. The latent representation (code) 520 may correspond to a segmentation map for the input 530. A segmentation map may indicate a spatial segmentation of the input 530 such as an outline of an object location within the input 530. That is, the spatial segmentation of the input 530 may indicate one or more regions of interest (e.g., an object or a person) of the input 530. The segmentation map may be binary segmentation map. That is, the segmentation map may indicate whether a region of the segmentation map is a region of interest using binary values. For example, a region of interest may be indicated using a value of 1, and a value of 0 may indicate that a region is not a region of interest (e.g., background). However, the present disclosure is not so limiting, and in some aspects, the segmentation may also be continuous. For instance, a segmentation may include multiple regions of interest and may indicate a priority or relative importance of the regions using continuous values.

On the other hand, the decoder 504 may be symmetrically configured relative to the encoder 502. For instance, as shown in the example of FIG. 5, the decoder 504 may include multiple transpose convolutional layers (Tconv), which are interleaved with an activation function such as the inverse GDN (IGDN). As such, the decoder 504 may receive the latent representation (code) 520. The decoder 504 may process the latent representation (code) 520 through the successive interleaved layers (e.g., Tconv-IGDN) to decode the latent representation (code) 520 and generate a reconstruction 550 of the input 530.

The hyper-encoder 506 includes a set of convolutional layers (Cony). The convolutional layers may be interleaved with an activation function, such as a rectifier linear unit (ReLU) (not shown). The hyper-encoder 506 receives the latent representation (code) 520 of the input 530. The hyper-encoder 506 processes the latent representation (code) 520 of the input 530 through the successive interleaved layers (e.g., conv-ReLU) to generate a hypercode. The hypercode may be quantized via a round block and supplied to an arithmetic encoder (AE). The arithmetic encoder (AE) entropy codes the hypercode converting it to a bit stream that is transmitted to the hyper-decoder 508.

The hyper-decoder 508 may be symmetrically configured relative to the hyper-encoder 506. The hyper-decoder 508 may include a set of transpose convolutional layers (Tconv), which may be interleaved with an inverse ReLU activation. The hyper-decoder 508 may receive the bit stream transmitted from the hyper-encoder 506 via an arithmetic decoder (AD). The arithmetic decoder (AD) entropy decodes the bit stream to recover the hypercode. The hyper-decoder 508 processes the hypercode through the successive layers of transpose convolutional layers to decode the hypercode and determine a location (loc) and a scale corresponding to latent representation (code) 520 of the input 530.

The compression pipeline 570 may be configured with gain control (e.g., 510 512, 514, and 516). Rather than applying compression uniformly across different spatial locations of the latent representation (code) 520, the gain control enables controllable compression for different spatial locations of the latent representation (code) 520. That is, compression may be differentially performed for different regions of the input 530. A quantization bin size (which may be considered as the gain) may be adjusted for more salient portions of the input 530. For instance, more bits may be allocated to a region of interest (ROI) than to a non-ROI (e.g., background) during compression.

The compression pipeline 570 takes the latent representation (code) 520 corresponding to the spatial segmentation map of the input 530. The gain 510 is applied such that the segmentation map is multiplied by the gain 510. The gain control elements may control rate-distortion tradeoff. The larger the gain, the more coarse the quantization bin, and in turn the lower the rate and the higher the distortion. That is, a larger gain value may correspond to a larger quantization bin size and conversely a smaller gain value may correspond to a smaller quantization bin size. Because the gain is applied to each latent representation code (520) of the input 530, it can then control the rate-distortion tradeoff differently for each spatial location of the input image.

In some aspects, the gain 510 may be configured based on the segmentation map. The output of the gain 510 may be quantized, for example, via the round block. The quantized latent may be supplied to the arithmetic encoder (AE), which performs entropy coding to convert the quantized latent into a bit stream, which may be transmitted to the decoder 504.

The bit stream may be received via an arithmetic decoder (AD), which decodes the bit stream to recover the quantized latent representation. A reciprocal gain 516 is applied to the quantized latent. A segmentation map (code) 522 is produced using the location and the scale values determined via the hyper-decoder 508.

Figure 6:
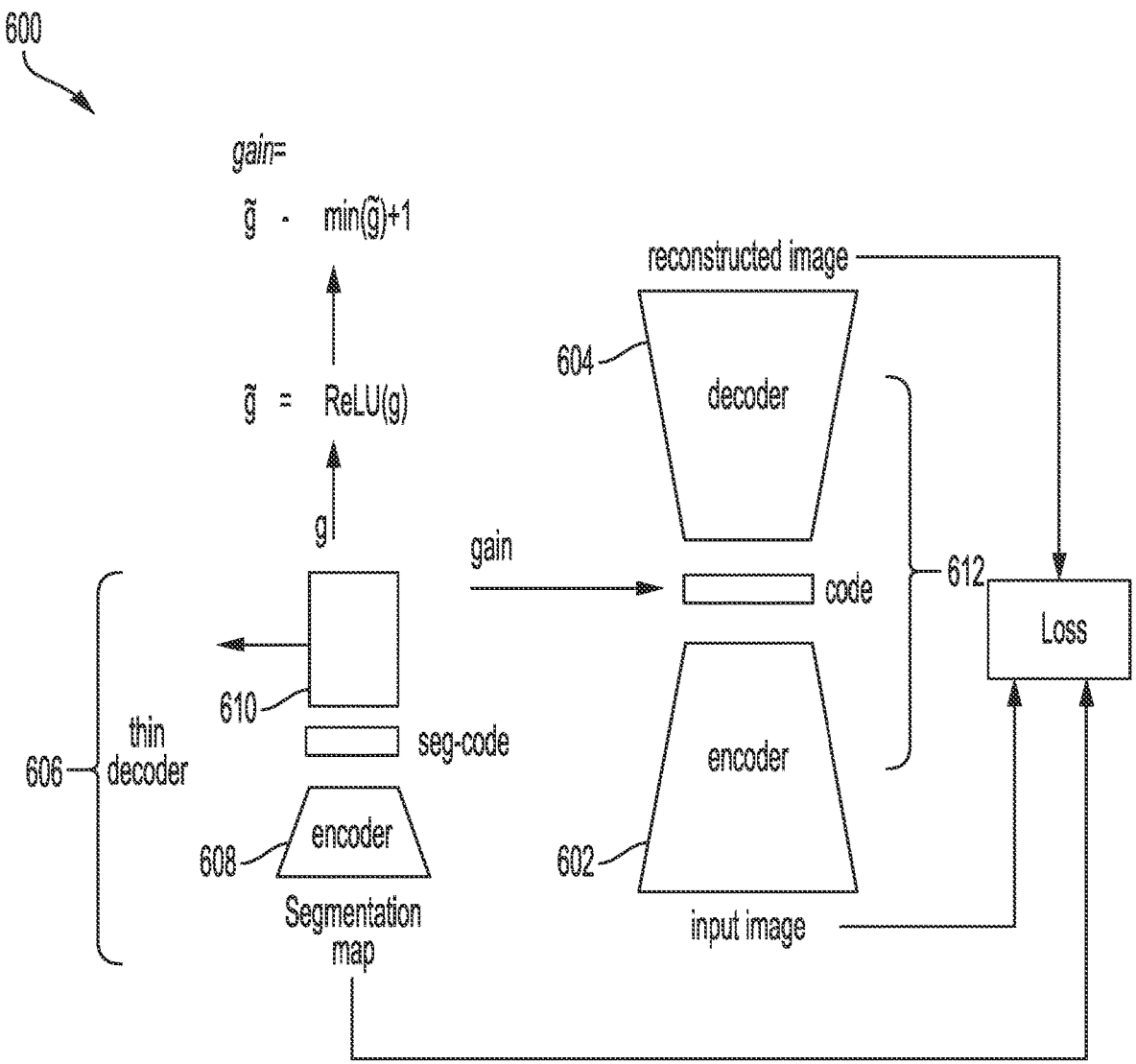
FIG. 6 is a block diagram illustrating an example architecture for compressing an input, in accordance with aspects of the present disclosure.

FIG. 6 is a block diagram illustrating an example architecture 600 for compressing an input, in accordance with aspects of the present disclosure. Referring to FIG. 6, the architecture 600 includes an encoder 602 and a decoder 604. The architecture 600 may also include an auxiliary network 606. The auxiliary network 606 may include an auxiliary encoder 608 and an auxiliary decoder 610. The auxiliary network 606 may manage a compression pipeline between the encoder 602 and decoder 604. As shown in FIG. 6, the auxiliary encoder 608 receives a segmentation map as input and generates a segmentation code (seg-code). The segmentation code is supplied to the auxiliary decoder 610, which determines gain values for the compression pipeline.

In accordance with aspects of the present disclosure, the architecture 600 may be trained according to an objective function given by $R+\lambda D$, where R is rate, D is distortion, and $\lambda$ is a LaGrange multiplier. Using the objective function, an artificial neural network (ANN) may be trained to balance the rate R (number of bits) and distortion D. The rate R corresponds to a number of bits from an entropy coding phase and determines how much information to send. The rate R may be given R=seg-code+code. The distortion D may be calculated as a difference between an input at the encoder 602 and a reconstructed image output via the decoder 604. The distortion D may be given by the sum of the mean square error (MSE) of a region of interest (ROI) and the MSE (non-ROI). The LaGrange multiplier $\lambda$ may be a trade-off parameter used to balance the trade-off between the two objectives—reducing distortion and reducing the bit rate used to transmit the input.

In some aspects, the spatial segmentation map may be a binary segmentation map. Alternatively, the spatial segmentation map may be a non-binary segmentation map to provide smooth transitions between regions of interest and non-regions of interest, thereby reducing sharp changes in quality at boundaries between such regions.

Figure 7:
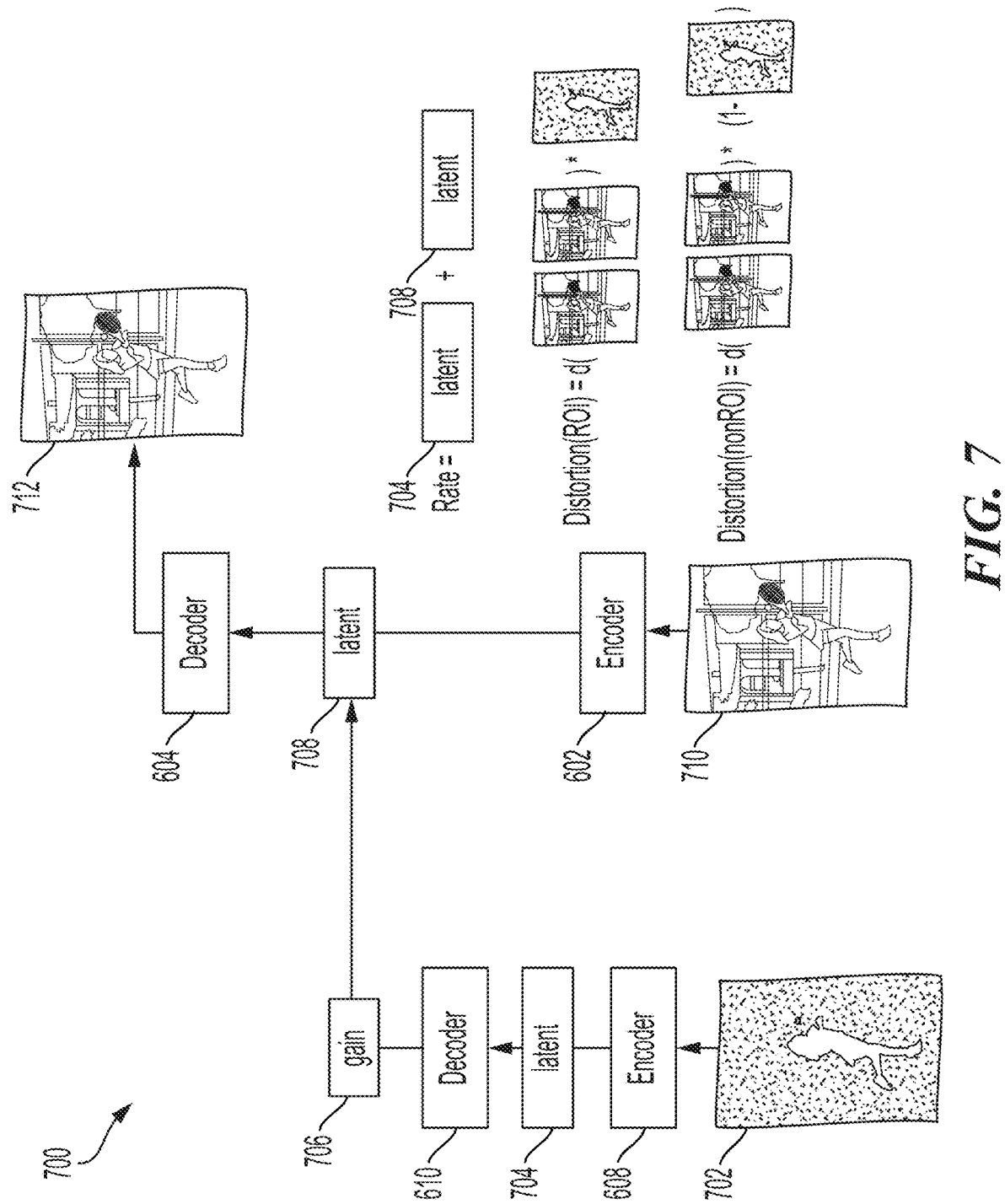
FIG. 7 is a block diagram illustrating computation of a training objective for neural compression, in accordance with aspects of the present disclosure.

FIG. 7 is a block diagram 700 illustrating computation of a training objective for neural compression, in accordance with aspects of the present disclosure. Referring to FIG. 7, a segmentation map 702 is supplied to an auxiliary network (e.g., 606 shown in FIG. 6 or hyper-encoder 506/hyper-decoder 508 shown in FIG. 5). The segmentation map 702 is received via an encoder 608 of the auxiliary network 606. The encoder 608 may process the segmentation map to generate a latent representation 704 (e.g., hypercode shown in FIG. 5) of the segmentation map 702. The latent representation 704 of the segmentation map 702 is supplied to a decoder 610 of the auxiliary network. The decoder 610 decodes the latent representation 704 to generate a gain value 706. The gain value 706 is applied to a latent representation 708 of an input 710 generated via an encoder 602 of the main network 612. The gain value 706 is applied to the latent representation 708 of the input 710 to control the compression of the latent representation based on regions of interest. As shown, the rate is given by the sum of the rate of the latent representation 704 from the auxiliary network and the rate of the latent representation 708 of the main network 612.

The distortion may be separated into two parts based on ROI (e.g., ROI or non-ROI). As described with reference to FIG. 6, the value λ controls the overall rate distortion trade-off. For the distortion on the non-ROI, a discount may be applied by dividing by a reduction factor (reduction-factor), which may serve as a hyper-parameter. Accordingly, when minimizing the objective function, more weight may be placed on the distortion (e.g., ROI) as controlled by the reduction-factor hyper-parameter. The distortion for the ROI may be expressed as the difference between the input image 710 and a reconstructed image 712 output via the main network multiplied by the ROI, where the difference is measured according to a per-pixel MSE. The per-pixel MSE is element-wise multiplied with the segmentation map and averaged. The distortion for the non-ROI may be expressed as the difference between the input image and the reconstructed image multiplied by the complement of the ROI (e.g., 1-ROI).

In some aspects, the training objective may be include a composite rate estimation and a composite distortion estimation. The training objective may be adjusted to balance the rate distortion trade-off based on the ROI and the non-ROI. For instance, the training objective may be expressed as:

$$\text{Rate} + \lambda * \text{distortion }(ROI) + \lambda * \frac{\text{distortion }(non-ROI)}{\text{reduction}-\text{factor}},$$

where the reduction-factor is a hyper-parameter (e.g., 10).

Figure 8:
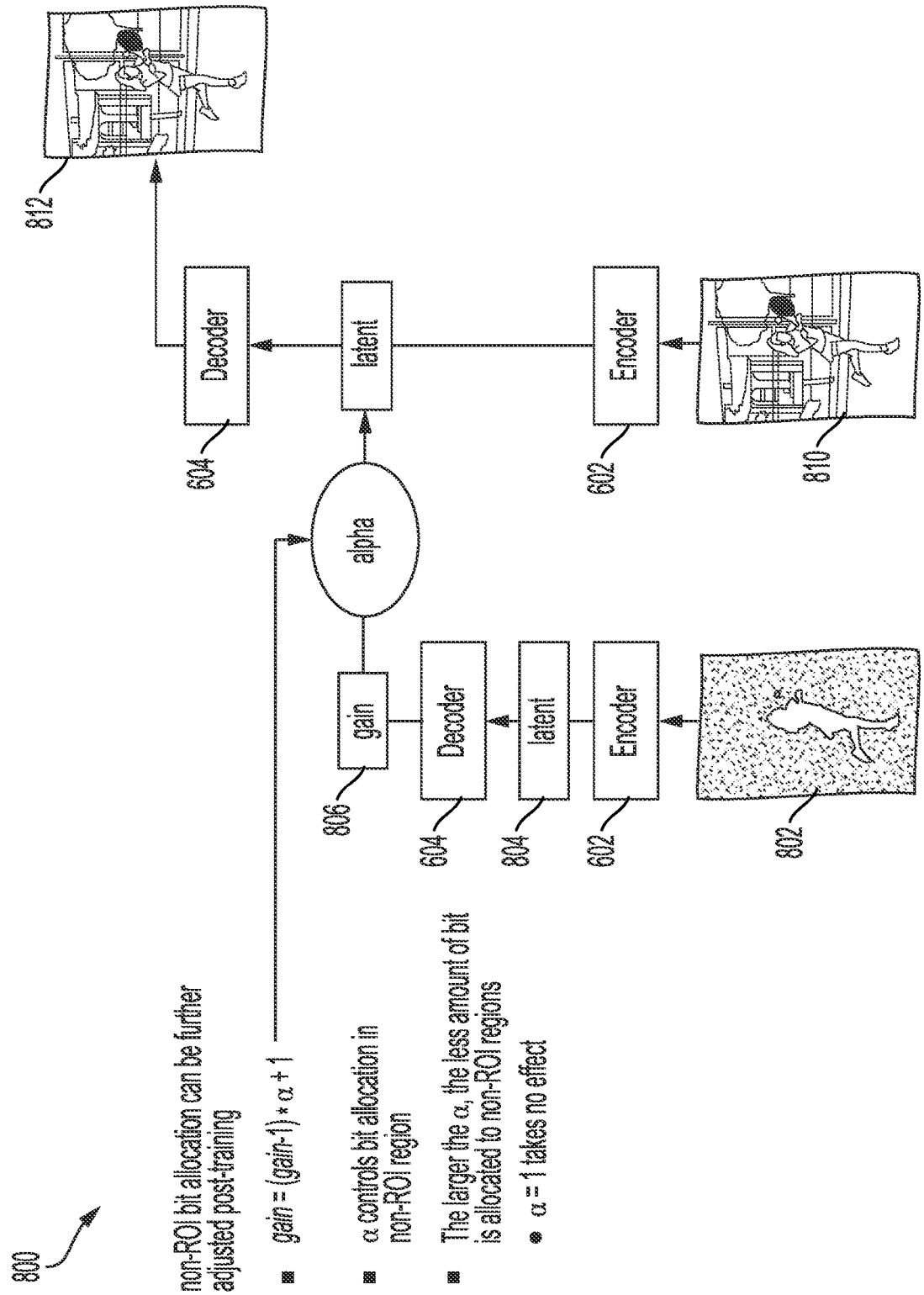
FIG. 8 is a diagram further illustrating neural compression with gain control, in accordance with aspects of the present disclosure.

FIG. 8 is a diagram 800 further illustrating neural compression with gain control, in accordance with aspects of the present disclosure. As shown in FIG. 8, the bit allocation for non-regions of interest may also be adjusted post-training (e.g., through scaling of the gain values). The gain may be modified by an additional parameter α, which controls the bit allocation for the non-ROI of the segmentation map. Accordingly, the modified gain may be given by:

gain=(gain−1)*α+1

By increasing the parameter α, bit allocation for non-ROI regions may be adjusted post-training, for example.

Figure 9A:
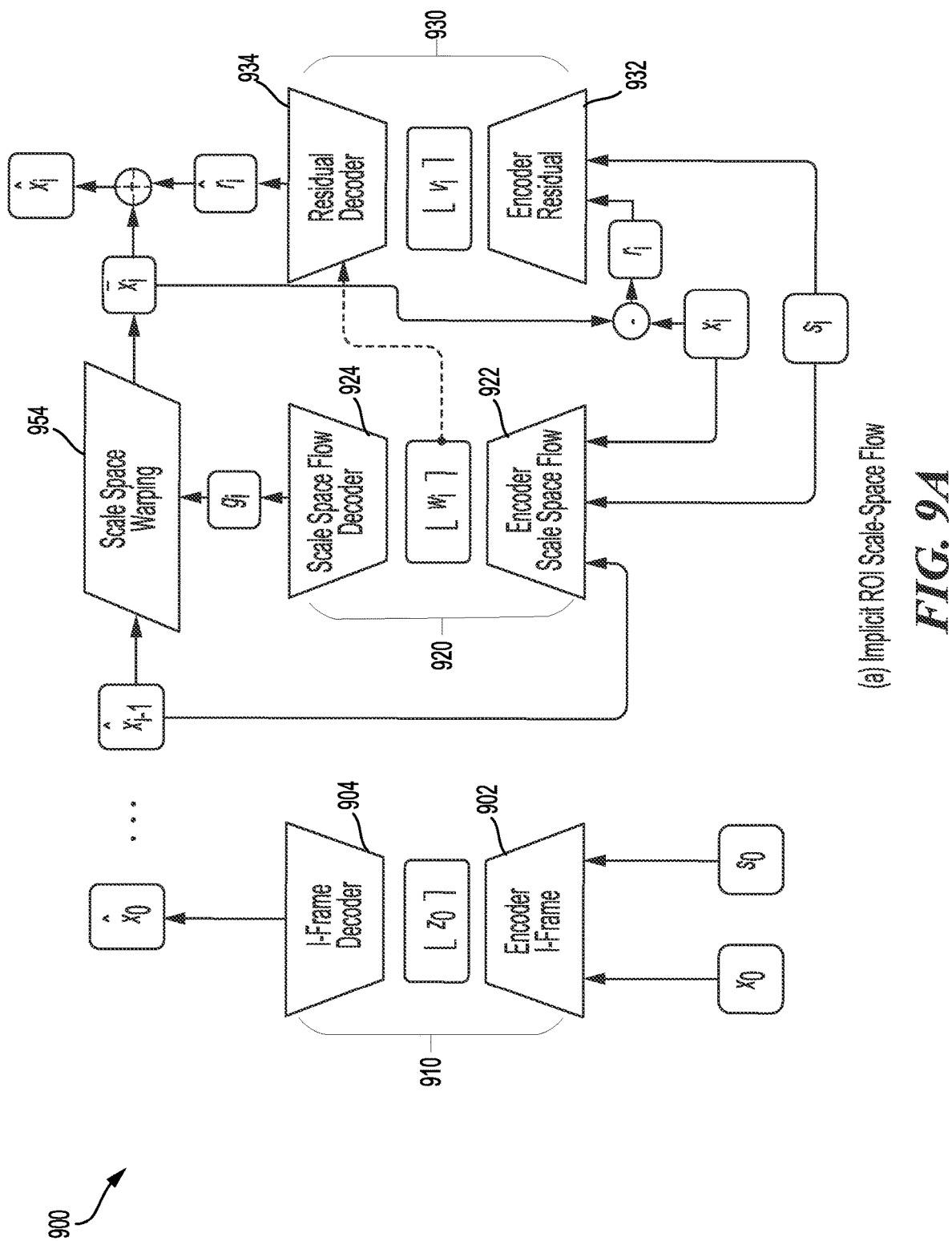

FIGS. 9A and 9B are block diagrams illustrating example architectures 900 and 950 for image compression with controllable spatial bit allocation using an artificial neural network (ANN), in accordance with aspects of the present disclosure. Referring to FIG. 9A, the example architecture 900 includes multiple hyperprior autoencoders 910, 920, 930. The example architecture 900 provides an ROI-aware framework using an ROI mask $s_i$ as an additional input to each of the hyperprior autoencoders 910, 920, 930. Notably, the ROI mask may not be fed to decoders 904, 924, 934 because encoders 902, 922, 932 may implicitly store relevant ROI information in the existing latent codes. Since the decoders 904, 924, 934 do not use the ROI mask, transmission of a representation of the mask may be avoided.

As shown in FIG. 9B, the example architecture 950 includes multiple hyperprior autoencoders 910, 920, 930. In addition, the example architecture 950 also includes multiple gain hyperprior AEs 952, 992. The gain hyperprior AEs 952, 992 encode the ROI mask $s_0$ into a latent code $z_0^s$, that is decoded to a gain variable $h_0$, which shares the same dimensions as the latent variable $z_0$, both spatially and channel-wise. A scale space warping unit 954 scales the latent $z_0$ with the inverse of the gain variable $h_0$, where $h_0 \geq 1$. In this manner, the gain may make the quantization grid more coarse, which may result in allocating less bits in these regions. The mean μ and scale σ may be denoted as prior parameters estimated by the I-frame hyper-decoder 904. In the quantization step, the scaled latent $z_0 \oslash h_0$ may be centered by its prior mean $\mu \oslash h_0$, where $\oslash$ is an element-wise division operator. A rounding operator $\lfloor \cdot \rceil$ may be applied on $(z_0-\mu)\oslash h_0$ such that the estimated mean μ learned by the hyper-encoder 902 is on the grid. The offset $\mu \oslash h_0$ may then be added back. The de-quantized latent $\hat{z}_0(h_0)$ may be obtained by multiplying by $h_0$. In turn, the de-quantized latent $\hat{z}_0(h_0)$ may be supplied to the decoder 904 to obtain reconstructed frame $\hat{x}_0$.

FIG. 10 is a flow diagram illustrating a processor-implemented method 1000 for compression using an artificial neural network (ANN), in accordance with aspects of the present disclosure. As shown in FIG. 10, at block 1002, an image and a spatial segmentation map corresponding to the image are received at an encoder of the ANN. The spatial segmentation map indicates one or more regions of interest. As described with reference to FIG. 5, an input 530 may be received by the encoder 502. The input 530 may be a visual input such as a video or an image, for example.

At block 1004, the image is compressed, via the encoder, according to a controllable spatial bit allocation. The controllable spatial bit allocation is based on a learned quantization bin size. As described with reference to FIG. 5, the compression pipeline 570 takes the latent representation (code) 520 corresponding to the spatial segmentation map of the input 530. The gain 510 is applied such that the segmentation map is multiplied by the gain 510. The gain control elements may control rate-distortion tradeoff. The larger the gain, the more coarse the quantization bin, and in turn the lower the rate and the higher the distortion. That is, a larger gain value may correspond to a larger quantization bin size and conversely a smaller gain value may correspond to a smaller quantization bin size. Because the gain is applied to each latent representation code (520) of the input 530, it can then control the rate-distortion tradeoff differently for each spatial location of the input image. In some aspects, the gain 510 may be configured based on the segmentation map. The output of the gain 510 may be quantized, for example, via the round block. The quantized latent may be supplied to the arithmetic encoder (AE), which performs entropy coding to convert the quantized latent into a bit stream, which may be transmitted to the decoder 504.

Figure 11:
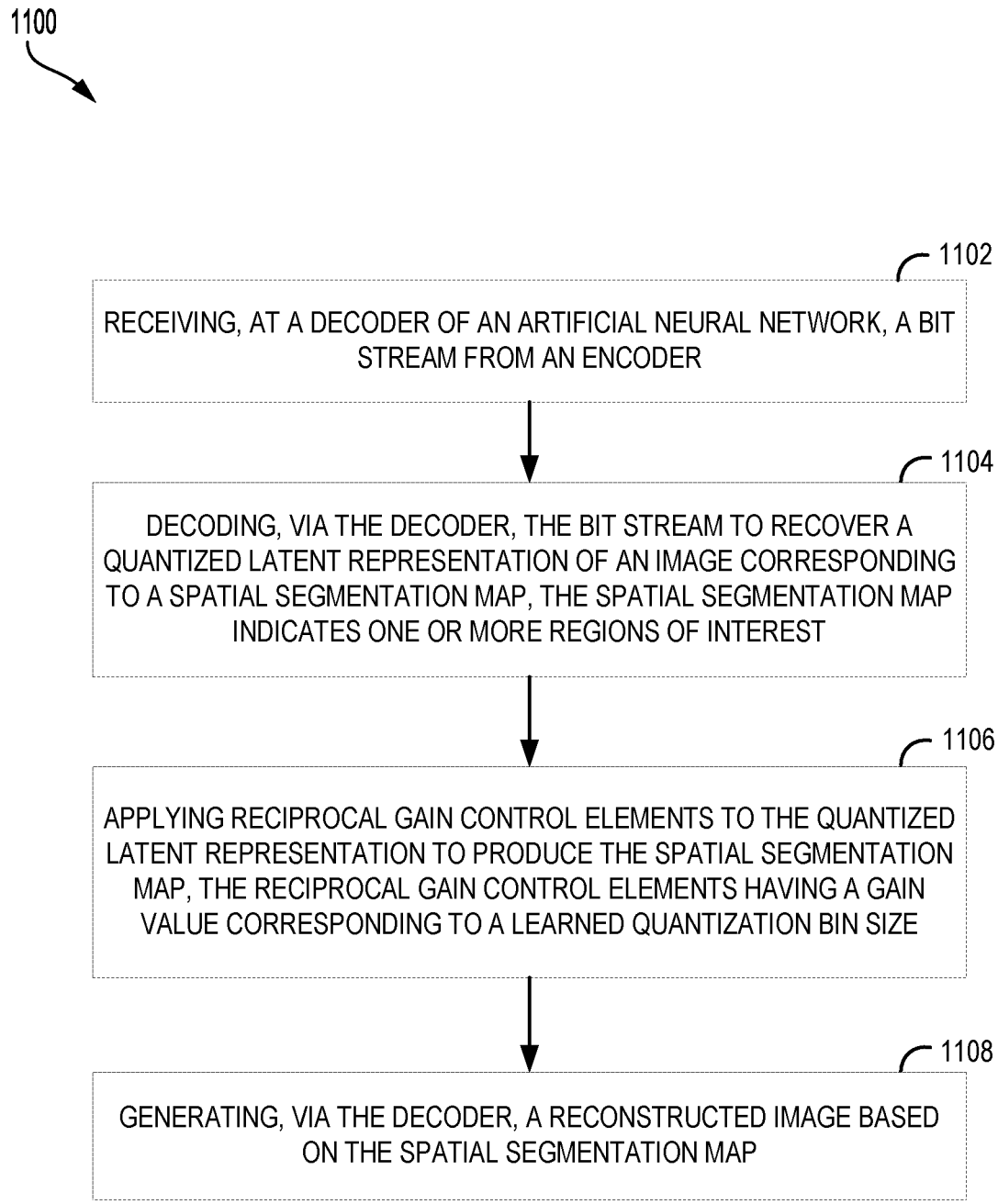

FIG. 11 is a flow diagram illustrating a process 1100 for compression using an artificial neural network (ANN), in accordance with aspects of the present disclosure. As shown in FIG. 11, at block 1102, a bit stream is received via an at a decoder of the ANN.

At block 1104, the bit stream is decoded, via the decoder, to recover a quantized latent representation of an image corresponding to a spatial segmentation map. The spatial segmentation map indicates one or more regions of interest. As described, for example, with reference to FIG. 5, the arithmetic decoder decodes the bit stream to recover the quantized latent representation of an image corresponding to the spatial segmentation map. The spatial segmentation of the input 530 may indicate one or more regions of interest (e.g., an object or a person) of the input 530.

At block 1106, reciprocal gain control elements are applied to the quantized latent representation to produce the spatial segmentation map, the reciprocal gain control elements having a gain value corresponding to a learned quantization bin size. As described, for example, with reference to FIG. 5, a reciprocal gain 516 is applied to the quantized latent. A segmentation map (code) 522 is produced using the location and the scale values determined via the hyper-decoder 508.

At block 1108, a reconstructed image is generated based on the spatial segmentation map.

Implementation examples are provided in the following numbered clauses.

1. A processor-implemented method, comprising:
   receiving, at an encoder of an artificial neural network, an image and a spatial segmentation map corresponding to the image, the spatial segmentation map indicating one or more regions of interest; and
   compressing, via the encoder, the image according to a controllable spatial bit allocation, the controllable spatial bit allocation is based on a learned quantization bin size.

2. The processor-implemented method of clause 1, further comprising:
   quantizing a latent representation of the image and the spatial segmentation map based on the learned quantization bin size; and
   transmitting the quantized latent representation of the image and the quantized segmentation map to a decoder.

3. The processor-implemented method of clause 1 or 2, in which the learned quantization bin size provides a different bit allocation for different regions of interest.

4. The processor-implemented method of any of clauses 1-3, in which a bit allocation for non-regions of interest is controlled via a reduction factor.

5. The processor-implemented method of any of clauses 1-4, in which the learned quantization bin size is adjusted based on a scaling parameter.

6. The processor-implemented method of any of clauses 1-5, in which the spatial segmentation map comprises a binary segmentation map.

7. A processor-implemented method, comprising:
   receiving, at a decoder of an artificial neural network, a bit stream from an encoder;
   decoding, via the decoder, the bit stream to recover a quantized latent representation of an image corresponding to a spatial segmentation map, the spatial segmentation map indicating one or more regions of interest;
   applying reciprocal gain control elements to the quantized latent representation to produce the spatial segmentation map, the reciprocal gain control elements having a gain value corresponding to a learned quantization bin size; and
   generating, via the decoder, a reconstructed image based on the spatial segmentation map.

8. The processor-implemented method of clause 7, in which the learned quantization bin size is based on the one or more regions of interest to control a rate-distortion tradeoff for each spatial location of the image.

9. The processor-implemented method of clause 7 or 8, in which the reciprocal gain control elements are configured based on the spatial segmentation map.

10. The processor-implemented method of any of clauses 7-9, in which the learned quantization bin size provides a different bit allocation for different regions of interest.

11. An apparatus, comprising:
    a memory; and
    at least one processor coupled to the memory, the at least one processor configured:
    to receive, at an encoder of an artificial neural network, an image and a spatial segmentation map corresponding to the image, the spatial segmentation map indicating one or more regions of interest; and
    to compress, via the encoder, the image according to a controllable spatial bit allocation, the controllable spatial bit allocation is based on a learned quantization bin size.

12. The apparatus of clause 11, in which the at least one processor is further configured:
    to quantize a latent representation of the image and the spatial segmentation map based on the learned quantization bin size; and
    to transmit the quantized latent representation of the image and the quantized segmentation map to a decoder.

13. The apparatus of clause 11 or 12, in which the learned quantization bin size provides a different bit allocation for different regions of interest.

14. The apparatus of any of clauses 11-13, in which the at least one processor is further configured to control a bit allocation for non-regions of interest via a reduction factor.

15. The apparatus of any of clauses 11-14, in which the at least one processor is further configured to adjust the learned quantization bin size based on a scaling parameter.

16. The apparatus of any of clauses 11-15, in which the spatial segmentation map comprises a binary segmentation map.

17. An apparatus, comprising:
    a memory; and
    at least one processor coupled to the memory, the at least one processor configured:
    to receive, at a decoder of an artificial neural network, a bit stream from an encoder;
    to decode, via the decoder, the bit stream to recover a quantized latent representation of an image corresponding to a spatial segmentation map, the spatial segmentation map indicating one or more regions of interest;
    to apply reciprocal gain control elements to the quantized latent representation to produce the spatial segmentation map, the reciprocal gain control elements having a gain value corresponding to a learned quantization bin size; and to generate, via the decoder, a reconstructed image based on the spatial segmentation map.

18. The apparatus of clause 17, in which the learned quantization bin size is based on the one or more regions of interest to control a rate-distortion tradeoff for each spatial location of the image.

19. The apparatus of clause 17 or 18, in which the at least one processor is further configured to configure the reciprocal gain control elements based on the spatial segmentation map.

20. The apparatus of any of clauses 17-19, in which the learned quantization bin size provides a different bit allocation for different regions of interest.

In one aspect, the receiving means, compressing means, quantizing means, transmitting means, decoding means, applying means and/or generating means may be the CPU 102, program memory associated with the CPU 102, the dedicated memory block 118, fully connected layers 362, NPU 428 and or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described without departing from the scope of the claims.

What is claimed is:

1. A processor-implemented method, comprising:
    receiving, at an encoder of an artificial neural network, an image and a spatial segmentation map corresponding to the image, the spatial segmentation map indicating one or more regions of interest;
    learning, at an auxiliary neural network, a quantization bin size based on the spatial segmentation map;
    generating a learned quantization bin size in accordance with the learning; and
    compressing, via the encoder, the image according to a controllable spatial bit allocation, the controllable spatial bit allocation is based on the learned quantization bin size.

2. The processor-implemented method of claim 1, further comprising:

quantizing a latent representation of the image and the spatial segmentation map based on the learned quantization bin size; and transmitting the quantized latent representation of the image and the quantized segmentation map to a decoder.

3. The processor-implemented method of claim 1, in which the learned quantization bin size provides a different bit allocation for different regions of interest.

4. The processor-implemented method of claim 1, in which a bit allocation for non-regions of interest is controlled via a reduction factor.

5. The processor-implemented method of claim 1, in which the learned quantization bin size is adjusted based on a scaling parameter.

6. The processor-implemented method of claim 1, in which the spatial segmentation map comprises a binary segmentation map.

7. A processor-implemented method, comprising:

receiving, at a decoder of an artificial neural network, a bit stream from an encoder;

decoding, via the decoder, the bit stream to recover a quantized latent representation of an image corresponding to a spatial segmentation map, the spatial segmentation map indicating one or more regions of interest;

applying reciprocal gain control elements to the quantized latent representation to produce the spatial segmentation map, the reciprocal gain control elements having a gain value corresponding to a learned quantization bin size that was learned at an auxiliary neural network; and generating, via the decoder, a reconstructed image based on the spatial segmentation map.

8. The processor-implemented method of claim 7, in which the learned quantization bin size is based on the one or more regions of interest to control a rate-distortion tradeoff for each spatial location of the image.

9. The processor-implemented method of claim 7, in which the reciprocal gain control elements are configured based on the spatial segmentation map.

10. The processor-implemented method of claim 7, in which the learned quantization bin size provides a different bit allocation for different regions of interest.

11. An apparatus, comprising:

memory; and at least one processor coupled to the memory, the at least one processor configured:

to receive, at an encoder of an artificial neural network, an image and a spatial segmentation map corresponding to the image, the spatial segmentation map indicating one or more regions of interest;

to learn, at an auxiliary neural network, a quantization bin size based on the spatial segmentation map;

to generate a learned quantization bin size in accordance with the learning; and to compress, via the encoder, the image according to a controllable spatial bit allocation, the controllable spatial bit allocation is based on a learned quantization bin size.

12. The apparatus of claim 11, in which the at least one processor is further configured:

to quantize a latent representation of the image and the spatial segmentation map based on the learned quantization bin size; and to transmit the quantized latent representation of the image and the quantized segmentation map to a decoder.

13. The apparatus of claim 11, in which the learned quantization bin size provides a different bit allocation for different regions of interest.

14. The apparatus of claim 11, in which the at least one processor is further configured to control a bit allocation for non-regions of interest via a reduction factor.

15. The apparatus of claim 11, in which the at least one processor is further configured to adjust the learned quantization bin size based on a scaling parameter.

16. The apparatus of claim 11, in which the spatial segmentation map comprises a binary segmentation map.

17. An apparatus, comprising:

memory; and at least one processor coupled to the memory, the at least one processor configured:

to receive, at a decoder of an artificial neural network, a bit stream from an encoder;

to decode, via the decoder, the bit stream to recover a quantized latent representation of an image corresponding to a spatial segmentation map, the spatial segmentation map indicating one or more regions of interest;

to apply reciprocal gain control elements to the quantized latent representation to produce the spatial segmentation map, the reciprocal gain control elements having a gain value corresponding to a learned quantization bin size that was learned at an auxiliary neural network; and to generate, via the decoder, a reconstructed image based on the spatial segmentation map.

18. The apparatus of claim 17, in which the learned quantization bin size is based on the one or more regions of interest to control a rate-distortion tradeoff for each spatial location of the image.

19. The apparatus of claim 17, in which the at least one processor is further configured to configure the reciprocal gain control elements based on the spatial segmentation map.

20. The apparatus of claim 17, in which the learned quantization bin size provides a different bit allocation for different regions of interest.

* * * * *